United States Patent [19]

Cairns et al.

[11] Patent Number: 5,580,461

[45] Date of Patent: Dec. 3, 1996

[54] PROCESS FOR TREATMENT OF A FLUID

[75] Inventors: William L. Cairns, London; John Carey, Hamilton; Jack M. Rosenfeld, Dundas, all of Canada

[73] Assignee: Trojan Technologies, Inc., London, Canada

[21] Appl. No.: 312,088

[22] Filed: Sep. 26, 1994

Related U.S. Application Data

[63] Continuation-in-part of Ser. No. 88,343, Jul. 9, 1993, abandoned, which is a continuation of Ser. No. 827,745, Jan. 29, 1992, abandoned, which is a continuation-in-part of Ser. No. 639,272, Jan. 10, 1991, abandoned.

[51] Int. Cl.$^6$ .................................................. C02F 1/28
[52] U.S. Cl. ....................... 210/673; 95/148; 210/676; 210/691; 210/694
[58] Field of Search ............................. 95/148; 210/670, 210/673, 675, 691, 694, 763, 678, 676; 502/5

[56] References Cited

U.S. PATENT DOCUMENTS

| | | | |
|---|---|---|---|
| 2,969,297 | 1/1961 | Grosvenor | 210/675 |
| 3,935,294 | 1/1976 | Teller | 423/226 |
| 4,861,484 | 8/1989 | Lichtin et al. | 210/674 |
| 5,087,374 | 2/1992 | Ding | 210/694 |

FOREIGN PATENT DOCUMENTS

| | | |
|---|---|---|
| 0325133 | 7/1989 | European Pat. Off. |
| 60-187322 | 9/1985 | Japan |
| WO92/11915 | 7/1992 | WIPO |

Primary Examiner—Ivars Cintins
Attorney, Agent, or Firm—Fitzpatrick, Cella, Harper & Scinto

[57] ABSTRACT

A continuous process for treating a fluid comprising at least one chemical contaminant. The process comprises the steps of: (i) contacting the fluid with a particulate absorbent material; (ii) allowing the adsorbent material to adsorb the chemical contaminant present in the fluid and thereby produce a substantially purified fluid and a contaminant-carrying adsorbent material with the proviso that the adsorbent material is not completely loaded with the contaminant; (iii) separating the contaminant-carrying adsorbent material from the substantially purified fluid; (iv) contacting the contaminant-carrying adsorbent material with an aqueous slurry of a metal oxide in the presence of an electron acceptor and electromagnetic radiation in at least one of the ultraviolet and visible regions; (v) allowing the contaminant carried on the adsorbent material to decompose to form a product; (vi) dissociating the product from the contaminant-carrying adsorbent to provide a regenerated adsorbent material; (vii) recycling the regenerated adsorbent material to Step (i); and (viii) recycling the aqueous slurry to Step (iv). In Step (iv) of the process, contact of the contaminant-carrying adsorbent material with an aqueous slurry of metal oxide in the presence of an electron acceptor and electromagnetic radiation in at least one of the ultraviolet and visible regions leads, in Step (v), to decomposition of substantially all of the contaminant loaded onto the adsorbent material in Step (ii) resulting in a dissociation of the product(s) of decomposition to provide a regenerated adsorbent material (Step (vi)).

12 Claims, 1 Drawing Sheet

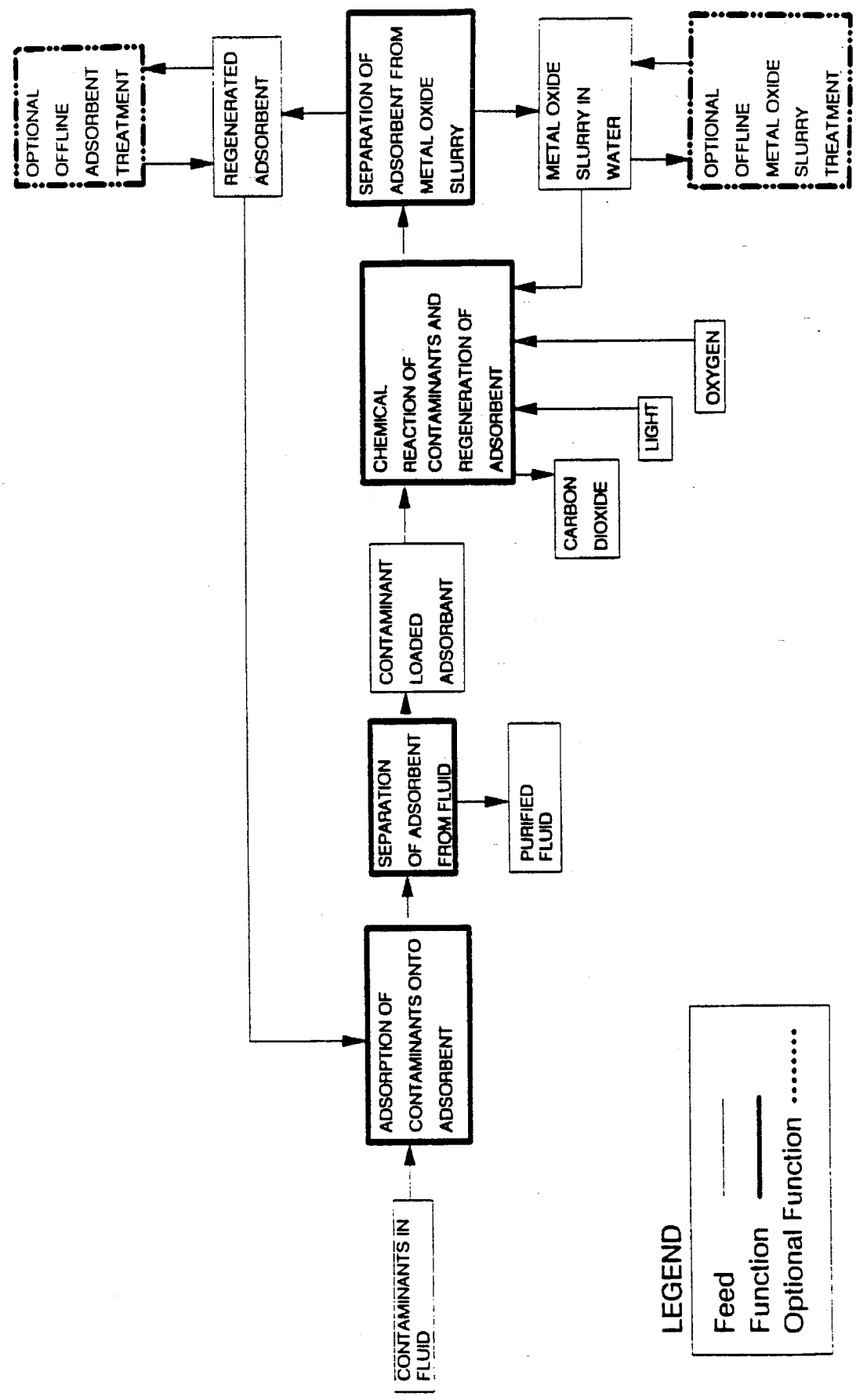

PROCESS FOR TREATMENT OF A FLUID

This application is a continuation-in-part of Ser. No. 08/088,343, filed Jul. 9, 1993, now abandoned, which is a continuation of Ser. No. 07/827,745, filed Jan. 29, 1992 (now abandoned), which was a CIP of Ser. No. 07/639,272, filed Jan. 10, 1991, now abandoned.

BACKGROUND OF THE INVENTION

1. Field of the Invention

The present invention relates to a process for treatment of a fluid comprising at least one chemical contaminant.

2. Description of the Prior Art

There are a number of known techniques available for purifying large volumes of fluids (i.e. liquids or gases); however limitations often are associated with these techniques.

For example, volatile organic compounds in liquids (e.g. ground water) can be removed by air stripping. This process is limited to removal of only those chemicals which can be partitioned between the liquid and gas phases. Moreover, such a process converts a liquid phase contamination problem to a gas phase contamination problem. In general, gas phase contamination problems are more difficult to deal with as they are unseen and can present a relatively severe environmental risk. The off-gases from air stripping processes must themselves be treated in most cases.

Another technique for purifying large volumes of fluids is adsorption of contaminating chemicals using, for example, solid phase granular activated carbon. Such techniques can become deficient when there is a need to replace the solid adsorbent material or, at the very least, regenerate it at frequent intervals thereby increasing the overall cost of the technique. Moreover, when such adsorbents are regenerated, cost intensive thermal destruction techniques are typically required and can potentially create a new contamination problem by release of undesirable pyrolysis products in the flue gases. If solvent extraction techniques are utilized for regeneration of the adsorbents, care must be exercised to ensure that residual solvent is removed from the adsorbent material prior to use. Regeneration of granular activated carbon by wet oxidation or extraction with supercritical fluids (e.g. liquified carbon dioxide) is costly and generally not suitable for on-site regeneration.

Yet another technique for purification of fluids involves addition of oxidants directly to the primary fluid. This technique is unable to efficiently remove contaminants which are present in low concentrations. This is due to the fact that the rates of reaction with oxidants are diffusion controlled. Thus, acceptable rates of reaction may typically require increased concentration of oxidants which results in an overall increase of the cost of the technique, is potentially hazardous and creates a need to dispose of the excess oxidant. Another problem associated with this technique is the relatively high probability that the reactive oxidant species will react with a quenching species prior to reaction with the target contaminant molecule. Again, this necessitates increasing the concentration of oxidant and bearing the additional expense associated therewith. Yet another problem associated with this technique is the difficulty associated with oxidation by-products and end-products formed during the treatment. Specifically, these species can be altered with changes in the contaminant/oxidant ration or with changes in process conditions. Since these species are created in the bulk fluid being treated, it is necessary to monitor the fluid volume being treated for control of formation of these species. In the case of complex mixtures of organic compounds in the primary fluid, the mixture of products can become even more complex, and monitoring these products can become exceedingly difficult. Further, if the concentration of these species in the fluid becomes too high, additional processing of the bulk fluid is required with the concurrent expense thereof.

Another known technique of removing contaminants from fluids comprises the use of illuminated photocatalysts such as titanium dioxide. One of the inventors named herein first published fifteen years ago on the ability of ultraviolet illuminated titanium dioxide to destroy organic contaminants in water [Carey et al., Dull. Environ. Contam. Toxicol. 16, 697, (1976) ]. Since that time, many publications, including a number of patents, have described how titanium dioxide may be used in water purification. However, heretofore, none of the prior processes known to the applicant has emerged as a commercially viable process. It is believed that there exist at least five reasons why prior processes have not been commercially successful.

First, current evidence supports the notion that destruction of organic contaminants occurs on the surface of the photocatalyst, and therefore an increase in surface area is required for high rates of reaction. To achieve this, slurries of colloidal titanium dioxide have typically been used in many processes; however, the recovery of the colloidal photocatalyst in the discharged effluent has not been cost efficient for high volume applications.

Second, immobilization of titanium dioxide on a support within the photoreactor has been suggested and has resolved the retention problem described in the previous paragraph. However, this solution has come at the expense of increasing mass transfer problems associated with movement of the contaminants in water to the immobilizing support which was more distantly spaced (for light penetration purposes) than the dispersed colloidal particles. Immobilization also creates a lack of uniformity in irradiation of photocatalytic particles which are immobilized at different distances and with different orientations to the light source. Larger photoreactors would therefore be needed to cope with the inefficiencies introduced by immobilization. With colloidal slurries (i.e. previous paragraph), mixing provided all particles with equal probability of being in low and high light intensity regions of the photoreactor.

Third, when treating dilute solutions, the resulting mass transfer problems reduce significantly the rate of chemical destruction in both the slurried and immobilized titanium dioxide processes described above. Unfortunately, these problems serve to restrict the fluid volumes treatable by a given amount of photocatalyst in any given time, and necessitate the use of large reactors to handle large fluid volumes. Since many applications, such as municipal drinking water purification, require treatment of large volumes with low concentrations of contaminants, prior art processes involving the use of photocatalysts in this manner are severely limited for such applications.

Fourth, the large surface area on closely spaced particles and other control parameters which favour purifying the fluid by loading of dilute contaminants onto the surface of the photocatalyst (a rate influencing step in the overall photocatalytic process) are not, except by coincidence, generally compatible with process control parameters such as ready light penetration into the fluid for the light-mediated step in the overall photocatalytic process.

Fifth, as in the case of using oxidants such as hydrogen peroxide or ozone directly on the fluid of interest, there is the risk that, in the absence of adequate process control when using photocatalysts, undesirable by-products or end-products will be released in the treated effluent. This is true for both the slurried and immobilized processes.

In light of the foregoing, it would be desirable to have a process capable of purifying fluids while minimizing or eliminating the above-mentioned deficiencies of the prior art. Ideally, such a process would be useful to remove chemical contaminants from fluids in a relatively simple and efficient manner, and would decompose or transform the removed contaminants to dischargeable and innocuous or otherwise desirable products which could, at the discretion of the user, be diluted with purified fluid or captured for further processing such as microbial treatment. Further, it would be advantageous if such a process could be easily adapted for purifying liquid and/or gas phase fluids.

SUMMARY OF THE INVENTION

It is an object of the present invention to provide a process which obviates or mitigates at least one of the above-mentioned deficiencies of the prior art when treating a fluid comprising at least one chemical contaminant.

Accordingly, the present invention provides a continuous process for treating a fluid comprising at least one chemical contaminant, the process comprising the steps of:

(i) contacting the fluid with a particulate adsorbent material;

(ii) allowing the adsorbent material to adsorb the chemical contaminant present in the fluid and thereby produce a substantially purified fluid and a contaminant-carrying adsorbent material with the proviso that the adsorbent material is not completely loaded with the contaminant;

(iii) separating the contaminant-carrying adsorbent material from the substantially purified fluid;

(iv) contacting the contaminant-carrying adsorbent material with an aqueous slurry of a metal oxide in the presence of an electron acceptor and electromagnetic radiation in at least one of the ultraviolet and visible regions;

(v) allowing the contaminant carried on the adsorbent material to decompose to form a product;

(vi) dissociating the product from the contaminant-carrying adsorbent to provide a regenerated adsorbent material;

(vii) recycling the regenerated adsorbent material to Step (i); and (viii) recycling the aqueous slurry to Step (iv).

In Step (iv) of the process, contact of the contaminant-carrying adsorbent material with an aqueous slurry of metal oxide in the presence of an electron acceptor and electromagnetic radiation in at least one of the ultraviolet and visible regions leads to decomposition of substantially all of the contaminant loaded onto the adsorbent material in Step (ii) resulting in dissociation of the product(s) of decomposition to provide a regenerated adsorbent material (Step (vi)).

Thus, an aspect of the present process relates to the use of an adsorbent material as a vehicle for continuous removal of a contaminant from a fluid. The multi-step process can be used for removing a chemical contaminant or chemical contaminants from a fluid (liquid or gas) and for partial or complete destruction of the chemical contaminant(s) to produce one or more products which are dischargeable or may be recovered, if desired.

Throughout the present process, the adsorbent material functions not solely as a storage reservoir for chemical contaminants awaiting destruction, but as continuous temporary shuttle mechanism for carrying concentrated aliquots of chemical contaminants between the fluid being purified (Steps (1). (ii) and (iii)) and the subsequent contaminant decomposition/absorbent regeneration (Steps (iv), (v) and (vi)). As is evident, the result of Steps (iv). (v) and (vi) of the present process is desorption of the product of decomposition from the contaminant-carrying absorbent material to provide a regenerated adsorbent material which is recycled to Step (i) of the process.

One of the main advantages of the present process is that operating parameters for each step of the process can be independently controlled for optimization of each step. However, integration of the steps into an overall process and process optimization involves co-ordinating the rate of loading the chemical contaminant from the fluid onto the adsorbent material, the rate of shuttling the contaminant-carrying adsorbent material between steps, and the interrelated rates of desorbing the contaminants from the loaded adsorbent material and of contaminant decomposition in the regeneration steps of the process.

In the present process, in which the adsorbent material is used continuously to shuttle contaminants between the fluid purification and contaminant decomposition steps, the rate of desorption of contaminants from the adsorbent material in the decomposition steps impacts heavily on how all steps of the process are individually and collectively optimized.

In the present process, the contaminant load on the adsorbent material can be controlled though regulation of contact time of the adsorbent material and the fluid being treated in order to optimize desorption kinetics. It is for the reason of optimization of desorption kinetics that, in the present process, the adsorbent material is not allowed to completely adsorb or become fully loaded (i.e. the rate of desorption of contaminants from the adsorbent material can dictate how all steps of the process, including adsorption, are individually and collectively optimized). This is in direct contrast to those prior art adsorption/destruction techniques which comprise batchwise loading of the contaminant onto a stationary (e.g. fixed bed) adsorbent material which acts as a temporary reservoir for contaminants awaiting decomposition. For these prior art processes, the level of contaminant loading for desorption rate control is not a controllable parameter for the user as it is in the present process. In fact, generally, in these prior art processes, it is desirable to fully load the adsorbent material since the batch process would be inefficient if an only partially loaded adsorbent material were regenerated (i.e. more regenerating chemicals and energy required for a given amount of contaminant).

The present process may be used to remove contaminants from and thereby purify fluids such as water, off-gases from air stripping processes and chimney gases. An adsorbent material is used to remove the chemical contaminant(s) from the fluid being treated and to shuttle concentrated aliquots of chemical contaminant(s) between the fluid and contaminant transformation/destruction Steps (iv), (v) and (vi) which result in the production of, inter alia, a regenerated adsorbent material.

BRIEF DESCRIPTION OF THE DRAWING

Embodiments of the present invention will be described with reference to the accompanying Figure of drawing in which there is illustrated a preferred mode of carrying out the present process.

DETAILED DESCRIPTION OF THE PREFERRED EMBODIMENTS

With reference to the accompanying Figure, Step (i) in the present process comprises contacting a fluid comprising at least one chemical contaminant with a particulate adsorbent material.

Step (ii) comprises allowing the adsorbent material to adsorb the chemical contaminant present in the fluid to produce a substantially purified fluid and a contaminant-carrying adsorbent material with the proviso that the adsorbent material is not completely loaded with the chemical contaminant.

The term "not completely loaded", when used throughout this specification with respect to the amount of chemical contaminant loading onto the adsorbent material, is meant to encompass loading of the chemical contaminant to less than 100 percent of the loading values possible if the adsorbent were allowed to come to equilibrium with a solution having a concentration at equilibrium equal to that of the initial contaminant concentration in the fluid.

As stated hereinabove, the adsorbent material functions as a temporary shuttle between contaminant removal from the fluid and contaminant destruction/decomposition. The adsorbent material in the present process does not function as a long term storage mechanism. Thus, in Step (ii) of the present process, the adsorbent material is only partially loaded with contaminant. As will be appreciated by those of skill in the art, intraparticulate transport phenomena will serve to maintain the newly adsorbed contaminant highest in concentration in the regions of the adsorbent in closest contact with the fluid being purified.

The form of the fluid to be treated in the present process is not particularly restricted and may be selected from the group consisting essentially of gas, liquid and a combination thereof. A preferred gaseous fluid comprising at least one chemical contaminant is air or chimney/flue gases. A preferred liquid fluid comprising at least one chemical contaminant is water.

The choice of particulate adsorbent material is not particularly restricted and the choice thereof may be ascertained by a person skilled in the art. The adsorbent material should of course be capable of adsorbing the chemical contaminant present in the fluid being treated. The chemical contaminant will be either organic or inorganic in nature and, to at least some extent, this dictates the choice adsorbent material. Thereafter, selection of the adsorbent material for use in the present process is within the purview of a person skilled in the art and typically depends on one or more parameters. For example, the choice of adsorbent material may depend on the following: a) the nature of the chemical contaminant being removed from the fluid and the nature of the fluid itself (i.e. the relative affinity of the chemical contaminant for the adsorbent material and the fluid); b) the rate of adsorption in the adsorption step (Step (ii)) and the rate of desorption in Step (vi); c) the resistance of the adsorbent to destruction in the subsequent contamination decomposition/oxidation step (Steps (v) and (vi)); and d) the utility of the adsorbent material in the decomposition of the contaminant in Step (v) including: i) the ability of the adsorbent material to catalyze chemical reaction of the contaminant after separation of the contaminant-carrying adsorbent material from the fluid (i.e. after Step (iii)), and ii) the affinity, if any, of the adsorbent material for products of the chemical reaction other than carbon dioxide.

For example, if the chemical contaminant to be removed from the fluid is an organic pollutant, non-limiting examples of adsorbent materials suitable for use in the present process include: natural zeolites, synthetic zeolites, molecular sieves, silica gel, activated alumina, activated carbon, hydroxylapetite and the like.

As discussed hereinbefore, the adsorbent material used in the present process functions, inter alia, as a contaminant vehicle or carrier between the fluid being treated and the oxidation step. Thus, the adsorbent material is not allowed to become fully loaded with contaminant before it is separated from the substantially purified fluid in Step (iii) of the process. Accordingly, packed column considerations of column capacity and breakthrough are not the primary concern in the present process (these are usually of concern in fixed bed and similar prior art processes). Countercurrent flow considerations are more relevant in the present process. For example, the rates of adsorption (Step (ii) and contaminant decomposition/desorption steps (Steps (iv), (v) and (vi)) are the preferred determining factors for adsorbent material parameters such as composition, particle size distribution and porosity of the adsorbent material, and rate of contaminant-carrying adsorbent transport between the adsorption step (Step (ii)) and decomposition/desorption step (Steps (iv), (v) and (vi)).

With further reference to the Figure, in Step (iii) of the present process, the contaminant-carrying adsorbent material is separated from the fluid thereby producing a substantially purified fluid. The means by which this separation is accomplished is not particularly restricted. The contaminant-carrying adsorbent material may be physically removed from contact with the fluid by known techniques including: sedimentation, filtration, centrifugation, membrane technology, screens and other techniques resulting in withdrawal of substantially all of the contaminant-carrying adsorbent material from the substantially purified fluid.

With further reference to the Figure, after the contaminant-carrying adsorbent material is separated from the substantially purified fluid, the former is contacted, in Step (iv) of the process with an aqueous slurry of a photocatalytic metal oxide, preferably in powder form, in the presence of an electron acceptor and electromagnetic radiation in at least one of the ultraviolet and visible regions.

The term "electron acceptor", as used throughout this specification is meant to encompass a chemical which will accept electrons in a redox reaction. Non-limiting examples of such electron acceptors include oxygen and protons. The preferred electron acceptor suitable for use in the present process is oxygen.

The choice of photocatalytic metal oxide suitable for use in the present process is not particularly restricted. Non-limiting examples of metal oxides suitable for use in the present process include oxides of titanium, chromium, iron, silver, zirconium and the like. The preferred metal oxide is titanium oxide, more preferably the anatase form of titanium oxide. The anatase form of titanium oxide, in the presence of light of appropriate wavelength (i.e. less than 400 nm), will partially or completely photocatalytically oxidize organic compounds thereby, enhancing the rate of photocatalysis.

Thereafter, in Step (v) of the process, the chemical contaminant is allowed to decompose to form a product which, in Step (vi) of the process, dissociates from the contaminant carrying adsorbent material to provide a regenerated adsorbent material and, of course, the aqueous slurry and the product. Thus, in Step (v) of the present process, the contaminant adsorbed on the adsorbent material reacts chemically or photochemically or, put another way, is chemically transformed, to a product which may be recovered or safely discharged. This product no longer adsorbs to the adsorbent material and dissociates therefrom (Step (vi) of the process) to provide a regenerated adsorbent material which is then recycled, in Step (vii), to the Step (i) of process.

With regard to Step (v) of the process, it is believed that most active contaminant destruction/decomposition occurs at or near the surface of the adsorbent material. It is believed that this phenomena occurs due to a combination of factors which, as will be appreciated by those of skill in art, contribute by several concurrent mechanisms to enhance the rate of contaminant destruction/decomposition and hence regeneration of the adsorbent material. The factors influencing contaminant destruction/decomposition rate and hence adsorbent material regeneration include:

1. Access of contaminant on the adsorbent material and in the immediately adjacent fluid to the metal oxide and/or photocatalytically produced reactive intermediate;
2. Electromagnetic radiation intensity which can be absorbed by both the metal oxide and the contaminant on the adsorbent material and in the immediately adjacent fluids; and
3. Access of the metal oxide to the electron acceptor thereby enhancing the rate of photocatalysis.

The terms "decompose" and "chemically transformed", as used throughout this specification in the context of the breakdown of the chemical contaminant in Step (v) of the present process, have an identical meaning and relate to a chemical change in the originally absorbed chemical contaminant resulting in dissociation from the absorbent material and partial or complete destruction of the chemical contaminant. The exact nature of the decomposition or transformation is not particularly restricted provided that it occur in the presence of the absorbent material used in Step (i) of the process, the aqueous slurry of metal oxide photocatalyst, light and the electron donor (preferably oxygen).

The electromagnetic radiation utilized in the present process is in at least one of the ultraviolet and the visible regions. Generally, the ultraviolet region of the electromagnetic radiation spectrum is recognized as being defined by the range of wavelengths comprising from about 200 nm to about 400 nm. Further, the visible region of the electromagnetic radiation spectrum is recognized as being defined by the range of wavelengths comprising from about 400 nm to about 750 nm.

The use of electromagnetic radiation in Steps (iv) and (v) of the present process provides an environment in which one or both of photochemical and photocatalytic processes can occur. The extent to which either of these processes occurs depends, at least in part, on the exact nature of the chemical contaminant being decomposed.

For example, the occurrence of solely photochemical process during contaminant decomposition depends on the chemical contaminant being decomposed in Step (v) being capable of absorbing such radiation and undergoing a chemical change (e.g. rearrangement of chemical structure) in response thereto to produce a product. An example of a chemical compound capable of being decomposed upon exposure to ultraviolet radiation is dimethylnitrosamine. Various other organic molecules comprising aromatic structures and/or multiple bonds (e.g. C=C, C=O, C=N, N=O and the like) are also capable of being chemically transformed upon exposure to ultraviolet and/or visible radiation and do not necessarily require a photocatalytic process for at least partial decomposition thereof to occur.

A benefit of such a photochemical process is the likelihood of increased polarity of the "photoproduct" with the consequence that the partitioning of this photoproduct between the fluid and absorbent material favours desorption. This desorbed photoproduct may be more amenable to photocatalytic degradation on the surface of the dispersed photocatalyst particles in the aqueous slurry and thereby undergo further degradation. Photochemical transformation of already desorbed contaminant is also possible and again, an increase in polarity of then formed photoproduct reduces the probability of re-adsorption. In cases where Step (v) proceeds by direct photochemistry, the applied radiation should be absorbed by the contaminant while it is adsorbed on the adsorbent material. Since the photochemistry of most contaminants requires ultraviolet wavelengths in the range of from about 200 nm to about 400 nm, the use of lamps capable of emitting radiation in these wavelengths is preferred when photochemical regeneration is to be exploited in the overall process. Obviously, in cases where reaction of the absorbed contaminant is with reactive species generated in solution by the photocatalyst, absorption of light (i.e. radiation) by the absorbed contaminant is not necessary and the range of electromagnetic wavelengths may be readily determined by a person skilled in the art having regard to the requirements of the photocatalyst.

The limits of using photochemistry alone to degrade molecules beyond a certain point are reached when the photoproducts no longer absorb the applied wavelengths of light. Further degradation requires the presence of strong oxidants. The present process is capable of being used without addition, per se, of strong oxidants such as hydrogen peroxide or ozone which would add cost and safety concerns to the process. Thus, in Step (v) of the present process, an oxidant is produced, in situ, by reaction of the applied electromagnetic radiation with the photocatalyst metal oxide in the presence of water and molecular oxygen as a terminal electron acceptor.

Non-limiting examples of organic chemical contaminants which can be oxidized during Step (v) of the present process: tribalomethanes (e.g. chloroform), chlorinated aromatics (e.g. chlorobenzenes, chlorophenols and selected pesticides), alcohols, aldehydes, ketones, organic acids (e.g. benzoic acid), alkanes, aromatic hydrocarbons and the like. Non-limiting examples of inorganic chemical compounds which can be oxidized in Step (v) of the present process include: hydrogen sulphide, cyanide ion and the like.

Thus, it will be appreciated that the term "product", as used throughout this specification with respect to the product of decomposition of the contaminant in Step (v) of the process, is meant to encompass any of: (i) the photoproduct referred to above if solely a photochemical process occurs, (ii) the product of subsequent oxidation of the photoproduct if photochemical and photocatalytic processes occur; (iii) the product of oxidation of the chemical contaminant if solely a photocatalytic process occurs; and (iv) the photoproduct of any photocatalytically produced product.

As illustrated in the Figure, after the chemical contaminant has been removed, in the form of a product, from contaminant-carrying absorbent material, the adsorbent material is essentially regenerated. In order for the regenerated absorbent to be recycled (Step (vii) to Step (i) of the process where absorbent material is contacted with the fluid comprising at least one chemical contaminant, the regenerated absorbent must be separated from the aqueous slurry of photocatalytic metal oxide. The differences in particle size of the absorbent material and the colloidal metal oxide provide for relatively easy separation by any of a number of conventional methods.

Although externally added oxidants are not required for most applications of the present process, provision may be made within the process for special treatment of the adsorbent material and/or the photocatalytic metal oxide slurry. Such treatment may be required if refractory organics accumulate on the adsorbent material and/or the metal oxide, or remain within the aqueous phase of the slurry. The optional treatment can be conducted offline of the otherwise continuous process. The offline periodic treatment of the adsorbent material and/or metal oxide slurry is not particularly restricted and depends on the nature of the fluid and contaminants being treated, but may include pH changes, addition of solvents, addition of external oxidants or other treatments as required to regenerate process components.

The present process may be readily conducted in a continuous manner. For example, in a continuous operation, the adsorbent material may be transported in a countercurrent flow through Steps (i), (ii), (iv) and (v) of the process and subsequently recycled as regenerated adsorbent material to Step (i) of the process. In such an instance, the adsorbent transport rates would be selected along with other parameters to ensure that the rates of adsorption (Step (ii)) and chemical contaminant decomposition/desorption (Step (v)) are kept sufficiently high for process optimization.

The present process allows for relatively simplified quality control of fluid purification since the only monitoring required prior to discharge and following adsorptive removal of contaminants is for reduction of the concentration of the initial chemical contaminants. That is, since the chemical contaminant decomposition step is isolated, there is no need to monitor the fluid being discharged for the presence of identified or unidentified product. This is particularly advantageous in the case of treating a fluid liquid or gas which must be discharged or reused with the presence of not only reduced or negligible amounts of original chemical contaminant, but also of any products of the chemical contaminant decomposition step. In the case of chemical contaminants which are toxic pollutants in water or air, such an improvement in quality control is invaluable.

What is claimed is:

1. A continuous process for treating a fluid comprising at least one chemical contaminant, the process comprising the steps of:

(i) contacting the fluid with a particulate adsorbent material;

(ii) allowing the adsorbent material to adsorb the chemical contaminant present in the fluid and thereby produce a substantially purified fluid and a contaminant-carrying adsorbent material with the proviso that the adsorbent material is not completely loaded with the contaminant;

(iii) separating the contaminant-carrying absorbent material from the substantially purified fluid;

(iv) contacting the contaminant-carrying adsorbent material with an aqueous slurry of a metal oxide in the presence of an electron acceptor and electromagnetic radiation in at least one of the ultraviolet and visible regions such that the electromagnetic radiation is adsorbed by the contaminant adsorbed on the adsorbent material;

(v) decomposing the contaminant adsorbed on the adsorbent material to form a product;

(vi) dissociating the product from the contaminant-carrying adsorbent to provide a regenerated adsorbent material;

(vii) recycling the regenerated adsorbent material to Step (i); and (viii) recycling the aqueous slurry to Step (iv).

2. The process defined in claim 1, wherein said electron acceptor is oxygen.

3. The process defined in claim 2, wherein said metal oxide is titanium dioxide.

4. The process defined in claim 1, wherein said electromagnetic radiation includes wavelengths from about 200 to about 750 nm.

5. The process defined in claim 1, wherein said electromagnetic radiation includes wavelengths from about 200 to about 400 nm.

6. The process defined in claim 1, wherein said electromagnetic radiation includes wavelengths from about 300 to about 750 nm.

7. The process defined in claim 1, wherein Step (iii) comprises at least one of sedimentation, filtration, centrifugation, membrane separation, and screening.

8. The process defined in claim 1, wherein said absorbent material is selected from the group consisting of natural zeolites, synthetic zeolites, molecular sieves, silica gel, activated alumina, activated carbon, and hydroxyapatite.

9. The process defined in claim 8, wherein the chemical contaminant is organic.

10. The process defined in claim 1, wherein at least one of Steps (i) and (iv) are conducted in a manner such that the adsorbent material is transported countercurrent with respect to said fluid.

11. The process defined in claim 1, wherein said metal oxide is at least one member selected from the group consisting of oxides of titanium, chromium, iron, silver, zirconium and mixtures thereof.

12. The process defined in claim 1, wherein said metal oxide is in the form of a powder.

* * * * *